Oct. 18, 1927.
A. C. WOODRUFF
1,646,335
FOUR-WHEEL BRAKE
Filed Dec. 10, 1924
2 Sheets-Sheet 1
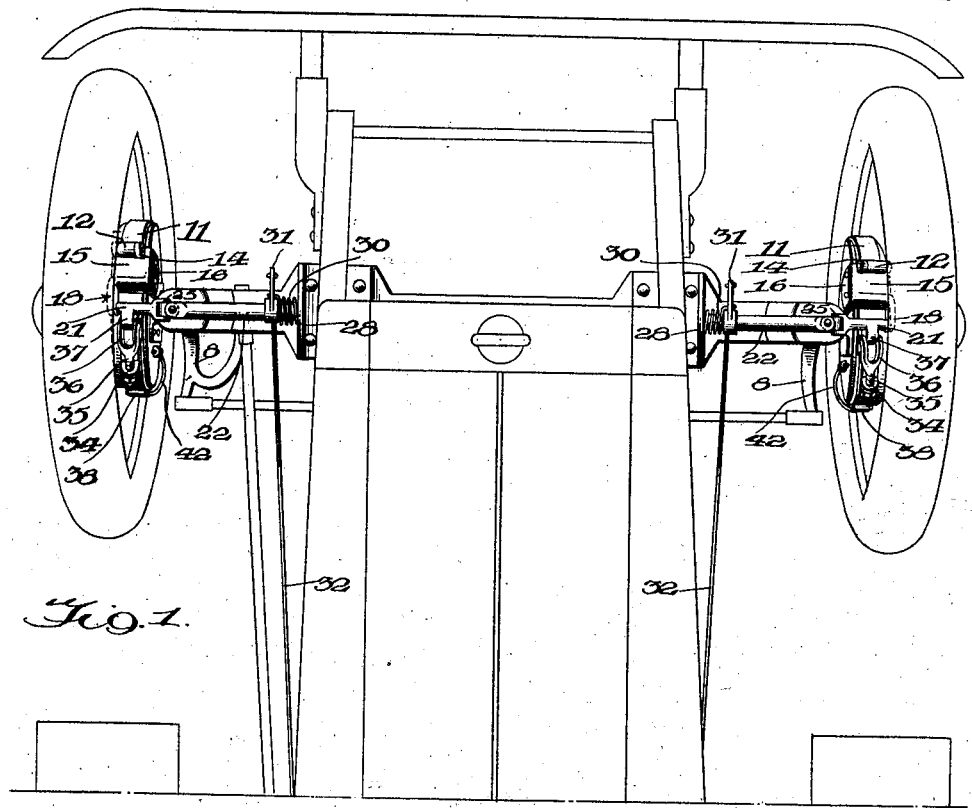

Oct. 18, 1927.  
A. C. WOODRUFF  
1,646,335  
FOUR-WHEEL BRAKE  
Filed Dec. 10, 1924   2 Sheets-Sheet 2
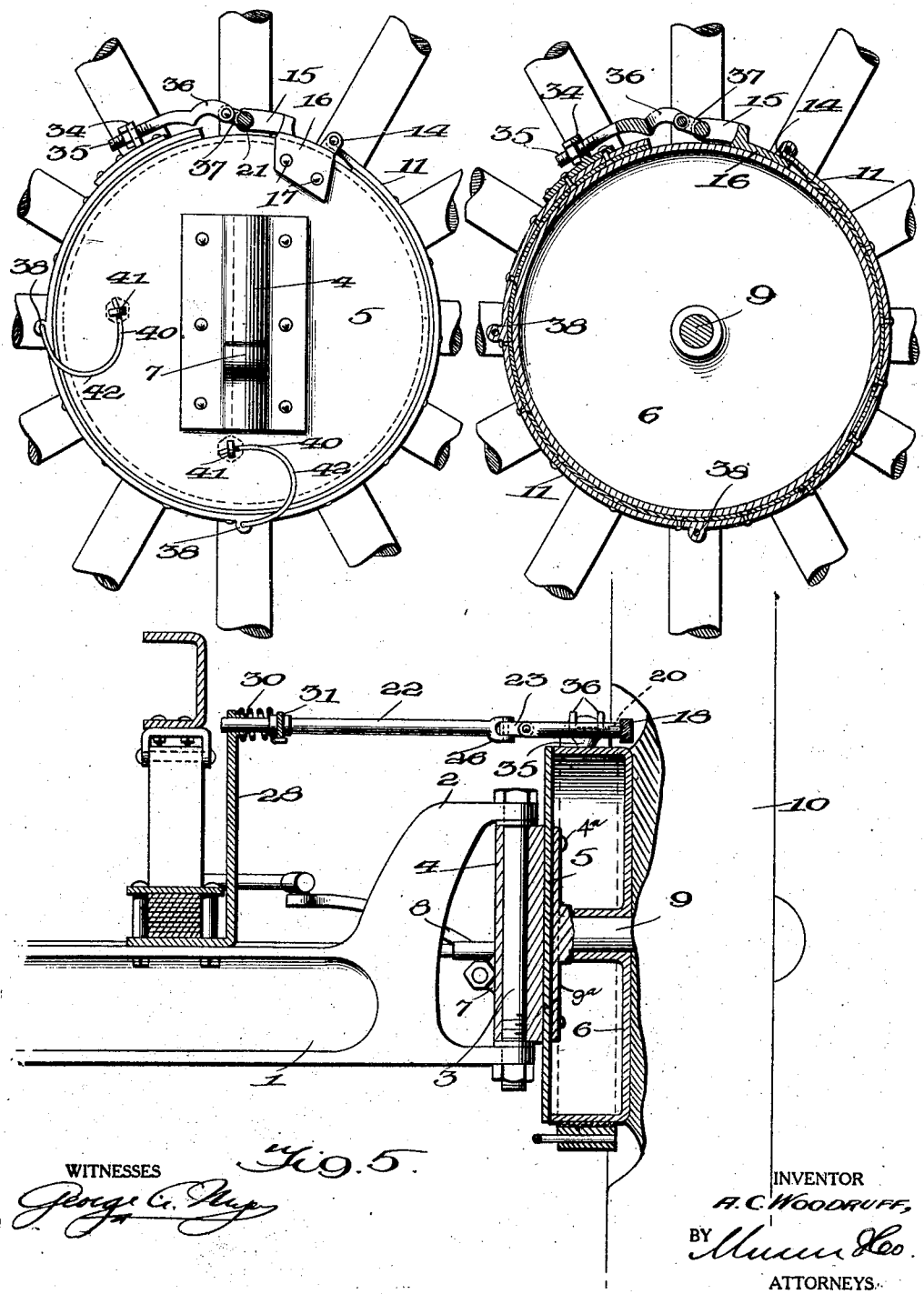
INVENTOR  
A. C. WOODRUFF,  
BY  
ATTORNEYS.

Patented Oct. 18, 1927.

1,646,335

UNITED STATES PATENT OFFICE.

ALVIE CLIDE WOODRUFF, OF OAKRIDGE, OREGON.

FOUR-WHEEL BRAKE.

Application filed December 10, 1924. Serial No. 754,996.

This invention relates to a braking mechanism and is more particularly directed to a device adapted to be used in connection with four wheel brakes.

An object of the invention is the provision of a brake adapted to be applied to the external surface of a brake drum and in which a plurality of externally mounted springs are adapted to maintain the brake band out of engagement with the brake drum.

A further object of the invention is the provision of a brake having a block pivotally connected at one end of the brake band and a toggle connecting said block to the other end with a universal shaft operating the block for tightening the band.

A still further object of the invention is the provision of a braking device which is readily interchangeable and may be applied to any of the wheels of the automobile.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of the front end of an automobile showing my improved braking mechanism applied to the front wheels.

Figure 2 is a view in perspective of the braking mechanism showing the elements of the same in detached relation.

Figure 3 is a view in elevation of a wheel hub and brake drum with my braking mechanism applied thereto.

Figure 4 is a similar view but looking from the opposite direction.

Figure 5 is a vertical transverse section of the braking mechanism and brake drum.

Referring more particularly to the drawings, 1 designates the front axle provided with a yoke 2 carrying a spindle 3. The spindle 3 is mounted in a bearing 4 cast integrally with a disc 5 forming a closure for a brake drum 6 or formed separately and secured to the disc as shown in Figure 2. Bearing 4 is provided with a socket 7 adapted to receive one end of a steering knuckle 8 which is common in automobiles. A spindle 9 is secured or cast integrally with a plate 9ª and upon which is revolubly mounted wheels 10. The plate 9ª, disc 5 and bearing plate 4 are provided with alined perforations through which are passed bolts 4ª for rigidly securing these three elements together.

Embracing the drum 6 is a brake band 11 having one end 12 pivotally connected by means of a pin 13 to a pair of ears 14 formed upon a block 15. The block has a depending portion 16 which is secured at 17 to the disc 5. The block is provided with an arm 18 projecting inwardly and provided with a bearing pin 19 adapted to be received within a socket 20 formed in the hollow end of a rock shaft 21. This rock shaft is connected to an operating shaft 22 by a universal connection 23. The universal connection comprises a link 24 pivotally connected with ears 25 of the shaft 21 and with the axis of the pivotal connection disposed in a horizontal plane while ears 26 of shaft 22 have a pivotal connection with the link 24, the axis of the pivotal connection being at right angles to the pivotal connection between the ears 25 and the link 24.

The outer end of the shaft 22 is mounted in a bearing 27 carried at the upper end of a bracket plate 28, the bracket being secured in any approved manner to the axle 1. A spring 30 engaging an operating arm 31 and an edge of the bracket 28 is adapted to normally maintain the arm 31 in a predetermined position and for returning the shafts 21 and 22 to their normal inoperative position. The arm 31 is perforated and adapted to receive one end of an operating link 32 which is adapted to be connected to a foot pedal which when operated is adapted to operate all four brakes at one time. The free end 33 of the band 11 is provided with an eye 34 adapted to receive the threaded end 35 of a yoke 36. The threaded end is held in place in the eye 35 by a nut. A perforated lug 37 is pivotally connected with the perforated end of the yoke 36.

Spaced sockets 38 are formed on the band 11 through which are inserted one end 39 of a spring member, the other end of the spring member being curved as shown at 40 and received within a perforated stud 41. The springs 42 are so disposed relative to the disc 5 and the band 11 that they will always tend to maintain the band in disengaged relation with the drum 6. When it is desired to apply the brake band it is only necessary to operate the usual brake pedal of the automobile whence the links 32 will be actuated for rocking shaft 22, shaft 21 and drawing on the yoke 36 whereby the free end 33 of the band is moved toward the block 15 thus tightening the band upon the drum. As soon as the pedal has been released the springs 42 co-operating with the spring 30 will move certain of the elements of a braking device to a normally inoperative position.

What I claim is:

1. In a vehicle, a steering wheel brake mechanism comprising a brake drum closure plate having a wheel spindle and adapted to be supported by a steering knuckle assembly, a block secured to the plate and overhanging the brake drum, a rock shaft having one end journaled by the block, a brake band with one end pivotally connected to the block, a link connection between the remaining end of the brake band and the rock shaft, an operating shaft, said operating shaft and rock shaft having bifurcated opposing ends, a link with its ends pivoted in said bifurcated ends of said shafts, the axes of the pivot points of said link being at right angles to each other, and a bearing carried by a stationary part of the vehicle for the other end of said operating shaft.

2. In a vehicle, a wheel brake mechanism comprising a brake drum closure plate having a wheel spindle, a block secured to the plate and overhanging the associated brake drum, a brake band with one end pivotally connected to the block, a brake operating shaft with one end journaled by the frame of the associated vehicle and its other end journaled by said block a link connection between the remaining end of the brake and said operating shaft, and a spring encircling the operating shaft tending to rotate said shaft to hold the brake band released from the drum.

ALVIE CLIDE WOODRUFF.